3,654,127
PROCESS FOR PREPARING HIGH VISCOSITY HYDROREFINED CABLE OIL

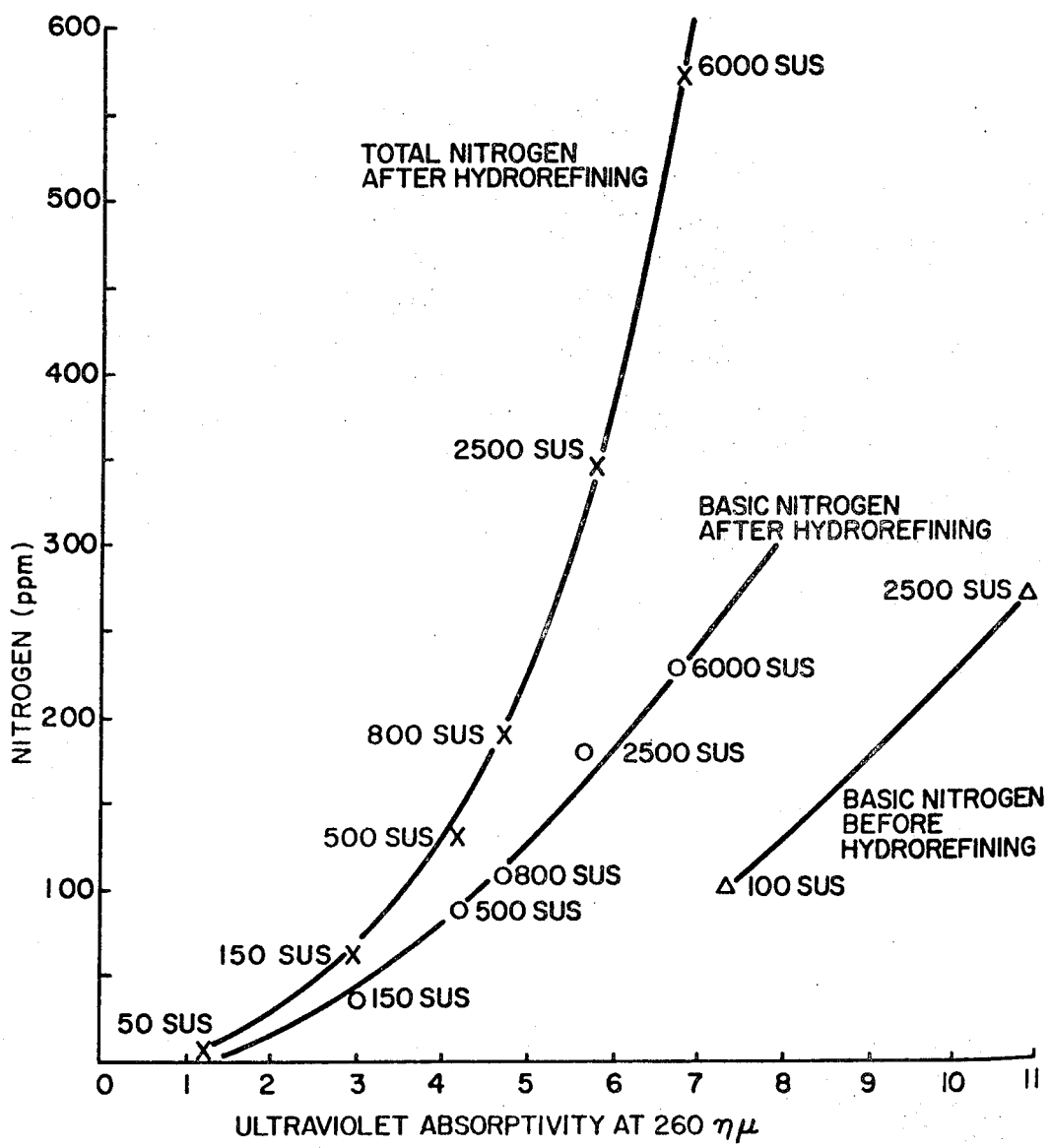
FIGURE I
TOTAL NITROGEN AND BASIC NITROGEN VS ULTRAVIOLET ABSORPTIVITY FOR NAPHTHENIC OILS OF DIFFERING VISCOSITY (AT 100°F)

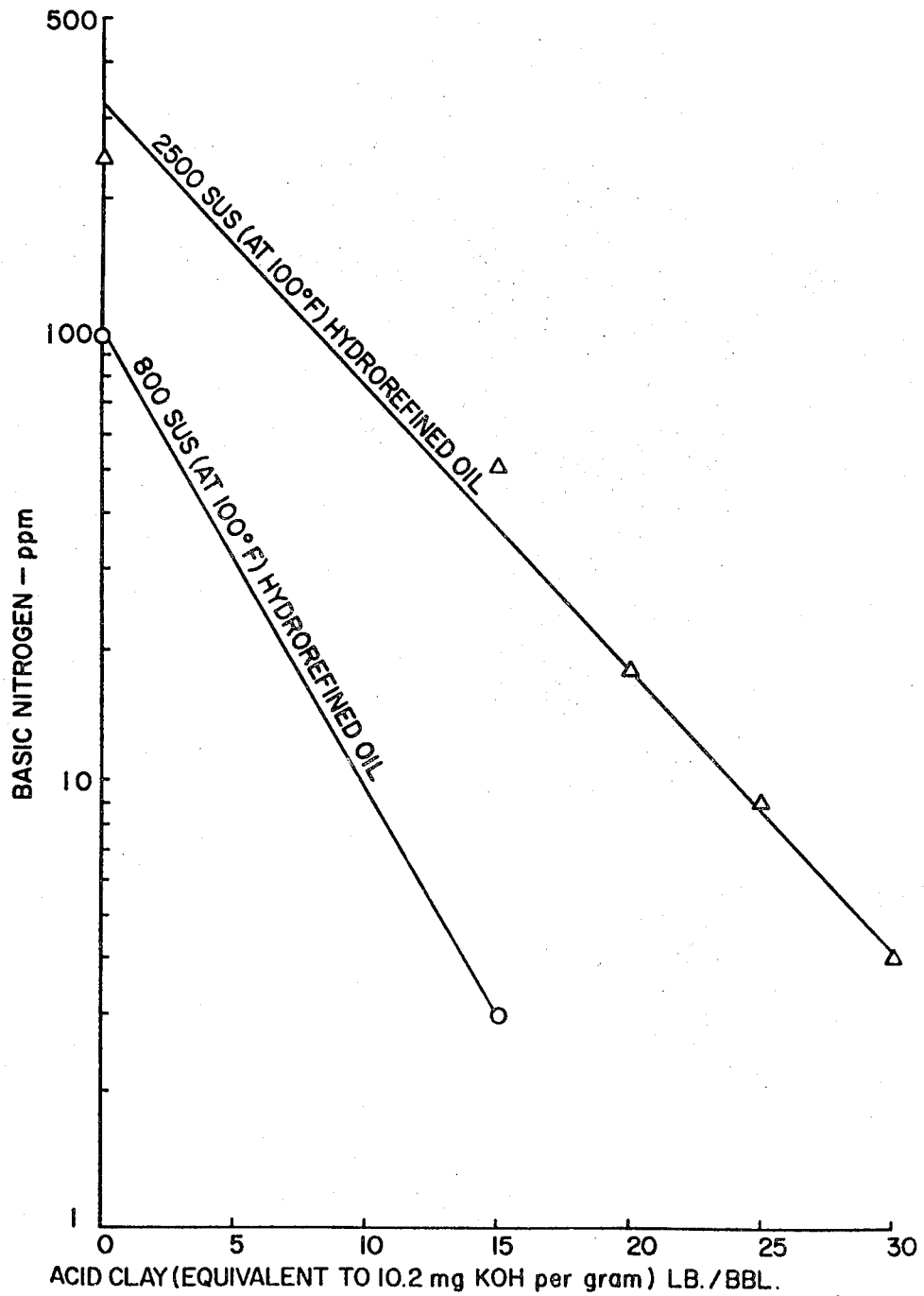

Ivor W. Mills, Media, and Glenn R. Dimeler and William A. Atkinson, Jr., West Chester, Pa., and James P. Hoffman, Wilmington, Del., assignors to Sun Oil Company, Philadelphia, Pa.
Filed Aug. 18, 1969, Ser. No. 850,778
Int. Cl. C10g 7/00; H01b 3/22
U.S. Cl. 208—14                                14 Claims

ABSTRACT OF THE DISCLOSURE

In a process wherein a topped naphthenic crude is heated and flash distilled under vacuum in a first distillation step to remove gas oil and lubricating oil fractions and a heavy residuum containing asphaltic and high molecular weight naphthenic acid components is obtained,, an improvement comprises (a) subjecting said heavy residuum to vacuum distillation in a second distillation step at a pressure lower than that to which the residuum was subjected in said first distillation step; (b) separating from the second distillation step a heavy distillate having an initial ASTM D-1500 color greater than 7.5, SUS viscosity at 100° F. in the range of 8100-14,000 SUS, a 260 UVA greater than 12.0 and containing high molecular weight naphthenic acids; (c) catalytically hydrogenating said heavy distillate at a temperature in the range of 500–775° F., with $H_2$ of 50-100% purity, and from 800-3000 p.s.i. of hydrogen at the reactor inlet (at total pressures from 800-6000 p.s.i.g.) at a fresh feed liquid hourly space velocity (LHSV) of from 0.1-8.0; and (d) recovering hydrogenated oil having an initial ASTM D-1500 color no greater than 2.5, a viscosity in the range of 5000-12,000 SUS at 100° F., an API gravity at 60° F. in the range of 15.5-18.5, a refractive index in the range of 1.51-1.53, a 260 UVA less than 10.0, a flash point above 425° F., a pour point greater than 10° F. and which contains at least 40 wt. percent gel aromatics.

CROSS REFERENCES TO RELATED APPLICATIONS

The present application is copending with the following listed applications, all of which are assigned to the Sun Oil Company, to which the present application is also assigned:

| Serial No. | Filing date | Title |
|---|---|---|
| 622,398 [1] | 3-13-67 | Clay Treatment of Hydrorefined Oils—Ivor W. Mills, Glenn R. Rimeler. |
| 652,026 | 7-10-67 | Process for Producing Cable Oils by Sequential Refining Steps—Ivor W. Mills, Glenn R. Dimeler |
| 636,493 | 5- 5-67 | Process for Preparing an Aromatic Oil and Non-Discoloring Rubber Composition Containing Said Oil—Ivor W. Mills, Glenn R. Dimeler, Merritt C. Kirk, Jr. |
| 730,999 | 5-22-68 | Hydrorefined Transformer Oil and Process o Manufacture—Ivor W. Mills, Glenn R. Dimeler. |
| 812,516 | 2-19-69 | Catalytic Hydrofinishing of Petroleum Distillates in the Lubricating Oil Boiling Range—Ivor W. Mills, Glenn R. Dimeler, Merritt C. Kirk, Jr., Albert T. Olenzak. |
| 850,779 [2] | (3) | Electrical Conduit Containing Hydrorefined Oil—Ivor W. Mills, Glenn R. Dimeler, John J. Melchoire. |
| 850,717 | (3) | Hydrorefined Lube Oil and Process of Manufacture—Ivor W. Mills, Glenn R. Dimeler. |
| 850,716 | (3) | Blended Hydrocarbon Oil and Process of Manufacture—Ivory W. Mills, Glenn R. Dimeler. |

[1] Now U.S. Patent No. 3,462,358.
[2] Now U.S. Patent No. 3,586,752.
[3] Filed of even date with present application.

The disclosure of all of the above-referred to applications is hereby incorporated herein by reference, particularly as to disclosure therein directed to hydrorefined oils in the lube viscosity range, to uses of such oils, and to the production of such oils.

All of the above-referred to copending applications contain disclosure relating to conditions, which can be used to produce severely hydrorefined petroleum distillate in the lubricating oil viscosity range.

BACKGROUND OF THE INVENTION

In copending application Ser. No. 622,398, filed Mar. 13, 1967 and titled "Clay Treatment of Hydrorefined Cable Oils," a process is claimed for producing an improved cable oil having an ASTM D-1934 aged dissipation factor (ADF) below 0.010 in the absence of added oxidation inhibitors, from a hydrogenated naphthenic oil having a viscosity in the range of 500-2000 SUS at 100° F., an ultraviolet absorbency (UVA) less than 8 at 260 millimicrons and having an ADF greater than 0.015, comprising contacting said oil at a temperature in the range of 100-400° F. with an adsorbent comprsing an acid-activated adsorbent clay in an amount per barrel of oil such that from 10-90 grams of KOH would be required to neutralize the acidity of the acid-activated adsorbent clay. Also claimed is a naphthenic electrical oil having a viscosity in the range of 500-2000 SUS at 100° F., having an ADF less than 0.010 in the absence of added oxidation inhibitors, and which requires at least 75 hours at PFVO test conditions to reach a 6% power factor. It was further disclosed that, in the case of the high viscosity cable oils (4000-6000 SUS at 100° F.), a relatively inexpensive fuller's earth bleaching clay was preferred as the adsorbent for such a hydrorefined oil and that the dosage of clay was not particularly critical insofar as the ADF of the resulting cable oil was concerned.

Also disclosed were hydrogenation conditions and catalysts which could be used to severely hydrorefine distillate oils in the lubricating oil viscosity range (35 and higher SUS at 100° F.). It was further disclosed that such severe hydrogenation should be conducted so that the 260 UVA of the feed to the hydrogenation step be reduced at least 40%.

Further disclosed in said application, by example, was that the degree of nitrogen removal caused by the severe hydrorefining can vary according to the viscosity of the charge oil (an oil having a viscosity of 107 SUS and containing 170 p.p.m. N produced an oil containing 47 p.p.m. N; whereas, an oil having a viscosity of 2901 SUS and containing 467 p.p.m. of N produced, under the same hydrogenation conditions, an oil containing 313 p.p.m. of N).

Although the art has produced heavy oil having a viscosity greater than 8000 SUS at 100° F., the usual source of such oils is the extract portion from highly viscous distillate oils or from the residuum from crude oil distillation (the extraction being with an aromatic selective solvent, such as furfural). Such extracts are generally higher in aromatic hydrocarbons and more dark in color than the charge to the extraction.

Such prior art high viscosity oils are useful in grease compounding but have been unsuitable for many uses. For example, such heavy oils are too highly colored to be satisfactory as plasticizers in light-colored rubber compositions. The electrical properties, such as the power factor, of such prior art high viscosity oils also make such oils unsuitable as an electrical insulating medium in modern electrical conduits.

The prior art has heretofore been unable to process heavy residuum from vacuum distillation of a topped naphthenic crude and produce an oil having an initial ASTM D–1500 color less than 2.5, a viscosity in the range of 5000–12,000 SUS at 100° F., an API gravity at 60° F. in the range of 15.5–18.5, a Refractive Index in the range of 1.51–1.53, a 260 UVA less than 10.0, a flash point above 425° F., a pour point greater than 10° F. and containing at least 40 weight percent gel aromatics. Such an oil (which is one embodiment of the present invention) is useful as a plasticizer for rubber compositions.

Additionally, the prior art has been unable to process a residuum or a high viscosity distillate and obtain an oil containing from 30–65 weight percent aromatics, having a viscosity in the range of 8100–12,000 SUS at 100° F. and which also has an ASTM D–1500 initial color no greater than 2.5, an initial ASTM D–924 power factor at 100° C. of no more than 0.01, an aged (with copper) ASTM D–1934 power factor at 100° C. no greater than 0.030, and an ASTM D–92 flash point of at least 500° F. Such an oil is useful as an electrical insulation medium and is one embodiment of the present invention.

BRIEF SUMMARY OF THE INVENTION

It has been discovered that heavy residum from the vacuum distillation of a topped naphthentic crude can be subjected to vacuum distillation in a second distillation step at a pressure lower than that to which the residuum was subjected in said distillation step, and from said second distillation step a heavy distillate can be separated having an initial ASTM D–1500 color greater than 7.5, SUS viscosity at 100° F. in the range of 8100–14,000, a 260 UVA greater than 12.0 and containing high molecular weight naphthenic acids. This highly colored, highly viscous heavy distillate can then be catalytically hydrogenated under conditions and with catalysts which are described hereinafter, and a hydrogenated oil can be recovered which has an initial ASTM D–1500 color less than 2.5, a viscosity in the range of 5000–12,000 SUS at 100° F., an API gravity at 60° F. in the range of 15.5–18.5, a Refractive Index in the range of 1.51–1.53, a 260 UVA less than 10.0, a flash point above 425° F., a pour point greater than 10° F. and containing at least 40 weight percent gel aromatics.

This process can also be used to produce a novel hydrogenated oil containing from 30–65 weight percent of gel aromatics, having a viscosity in the range of 8100–12,000 SUS at 100° F. and which by Engler distillation has a 5% point of at least 825° F., a 50% point of at least 925° F. and a 90% point of at least 975° F., said oil having an ASTM D–1500 initial color no greater than 2.5, an initial ASTM D–924 power factor at 100° C. of no more than 0.01, an aged (with copper) ASTM D–1934 power factor at 100° C. no greater than 0.030 and an ASTM D–92 flash point of at least 500° F.

It has also been discovered that such a hydrogenated oil can be further processed as with an adsorbent, such as an acid-activated adsorbent clay or a mixture of acid-activated and attapulgite clays or with a mineral acid, in order to further improve the electrical properties of the oil. Such additional processing can be used to produce an oil having a viscosity in the range of 5000–12,000 SUS at 100° F. and which also shows satisfactory electrical properties (including a stability under use conditions) for most uses as an insulating medium (particularly when the usual oxidation inhibitors, such as from 0.1–0.5 percent of DBPC are added to the oil).

However, it has been also found that the usual contacting with sulfuric acid or with attapulgite or acid-activated clays is not sufficient to reduce the basic nitrogen content of such oils to less than 5 p.p.m. An oil having a basic nitrogen as low as 8 p.p.m. can be obtained when the heavy distillate from the heavy residuum is contacted with 40 lbs. per barrel of $H_2SO_4$, and the resulting acid-contacted (and neutralized) oil is hydrogenated. However, to obtain an oil having less than 5 p.p.m. of basic nitrogen (and more preferably less than 2 p.p.m.), it has been discovered that the heavy distillate from the heavy residuum should be first contacted with from 5–50 lbs./bbl. of $H_2SO_4$ and then hydrogenated under the conditions disclosed hereinafter, following which the resulting hydrogenated oil should be contacted with from 5–30 lbs./bbl. of acid-activated clay. For an oil having an ADF at 100° F. below 0.0035 further adsorbent contacting, particularly with from 5–30 lbs./bbl. of attapulgite, is required. A single absorbent contacting step with a mixture of acid-activated and fuller's earth bleaching clays can also be used to produce such high viscosity cable oils having an ADF (with copper) at 100° F. of less than 0.0035.

An alternative procedure involves sulfuric acid contacting of the heavy distillate from the heavy residuum followed by contacting with clay (preferably a mixture of attapulgite and acid-activated clay) and then hydrogenation. The resulting hydrogenated oil can be finished by adsorbent contact, as with attapulgite, alumina, etc. The dosages of acid and adsorbent are chosen such that the final oil contains less than 5 p.p.m. of basic nitrogen.

In a process wherein a topped naphthenic crude is heated and flash distilled under vacuum in a first distillation step to remove gas oil and lubricating oil fractions and a heavy residuum containing asphaltic and high molecular weight naphthenic acid components is obtained, one embodiment of the present invention is the improvement which comprises (a) subjecting said heavy residuum to vacuum distillation in a second distillation step at a pressure lower than that to which the residuum was subjected in said first distillation step;

(b) separating from the second distillation step a heavy distillate having an initial ASTM D–1500 color greater than 7.5, SUS viscosity at 100° F. in the range of 8100–12,000 SUS, a 260 UVA greater than 12.0 and containing high molecular weight naphthenic acids;

(c) catalytically hydrogenating said heavy distillate at a temperature in the range of 500–775° C., with hydrogen of 50–100% purity, and from 800–3000 p.s.i. of hydrogen at the reactor inlet (at total pressures from 800–6000 p.s.i.g.), at a fresh feed liquid hourly space velocity of from 0.1–8.0; and (d) recovering hydrogenated oil having an initial ASTM D–1500 color less than 2.5, a viscosity in the range of 5000–12,000 SUS at 100° F., an API gravity at 60° F. in the range of 15.5–18.5, a refractive index in the range of 1.51–1.53, a 260 UVA less than 10.0, a flash point above 425° F., a pour point greater than 10° F. and containing at least 40 weight percent gel aromatics.

The oil recovered in step (d) can be contacted with a mineral acid (HF or $H_2SO_4$) or with a solid adsorbent (e.g., naturally occurring fuller's earth bleaching clay, activated carbon, alumina, acid-activated clay and mixtures of two or more of such absorbents) to recover an oil which contains from 30–65 weight percent of gel aromatics, has a viscosity in the range of 8100–12,000 SUS at 100° F. and which by Engler distillation has a 5% point of at least 825° F., a 50% point of at least 925° F. and a 90% point of at least 975° F., said oil having an ASTM D–1500 initial color no greater than 2.5, an initial ASTM D–924 power factor at 100° C. of no more than 0.01, an aged (with copper) ASTM D–1934 power factor at 100° C. no greater than 0.030 and an ASTM D–92 flash point of at least 500° F.

BRIEF DESCRIPTION OF THE DRAWINGS

In the drawings, FIG. 1 is a plot of the 260 UVA versus the nitrogen content (total or basic) of hydrorefined naphthenic oils of various viscosities. The hydrorefining of each charge oil was at 650° F., 0.5 LHSV (of the fresh feed), 1200 p.s.i.g. of 75% hydrogen (at the reactor inlet) with sulfided NiMo oxides on alumina as the catalyst. Also plotted is the basic nitrogen content of the charge stock (in the 100–2500 SUS viscosity range) before hydrorefining.

FIG. 2 is a plot of the pounds of acid-activated clay (equivalent to 10.2 mg. KOH per gram) required per barrel of hydrorefined oil to reduce the basic nitrogen to a given p.p.m. level in two of the severely hydrorefined naphthenic distillates from which the data plotted in FIG. 1 was obtained. The basic nitrogen is on a logarithmic scale, indicating that at lower concentrations it becomes increasingly more difficult to remove basic nitrogen with a single contacting step.

FURTHER DESCRIPTION OF THE INVENTION

Petroleum fractions (e.g., distillates, extracts, raffinates, reformer bottoms, cycle oil fractions, etc.) in the lubricating oil viscosity range (35–14,000 SUS at 100° F.) can be severely hydrorefined (e.g., at 600° F., 1200 p.s.i.g. of 80% hydrogen, 0.3 LHSV, presulfided Ni-Mo oxide catalyst) to produce a hydrogenated oil having a lighter ASTM color, a lower (by at least 40%) ultraviolet absorptivity at 260 millimicrons and containing appreciably less total nitrogen (and, if desired, lower gel aromatics) than was in the charge to the hydrorefining stage.

With some charges, such as paraffinic distillates, dewaxing and/or deasphalting can be advantageous prior to hydrorefining. Preferably, to insure longer catalyst life and to reduce hydrogen consumption, when the petroleum fraction is derived from a stock containing naphthenic acids, such acids should be removed (or substantially reduced) prior to hydrorefining as by the processes disclosed in the following United States patents: 1,603,174; 2,770,-580; 2,795,532; 2,966,456; and 3,080,312.

In the case of light lubes (e.g., having a viscosity in the range of 5–65 SUS at 100° F.), such as the transformer oils, the total nitrogen remaining in the oil after a single stage of severe hydrogenation can frequently be less than 10 p.p.m. (typically, less than 5 p.p.m.). Hydrorefining can also be conducted (in a single stage or in multiple stages) so as to obtain a hydrorefined (or hydroaromatized) oil with such low nitrogen and an increased gel aromatic content (as disclosed in the aforementioned application, Ser. No. 636,493).

Therefore, in light lubes and, particularly, in transformer oils, severe hydrogenation in a single stage is normally sufficient to reduce the basic nitrogen to less than 5 p.p.m. Generally, basic nitrogen is not a problem in such severely hydrorefined light lubes. Similarly, when the charge to a severe hydrorefining stage consists essentially of a paraffinic distillate in the lubricating oil boiling range, severe hydrogenation in a single stage is usually sufficient to effectively reduce both total and basic nitrogen to less than 10 p.p.m.

However, as is illustrated in FIG. 1 in the drawings attached hereto, when the charge stock is a naphthenic or aromatic distillate (including a raffinate or extract product from solvent extraction of a naphthenic distillate), having a viscosity greater than about 100 SUS, severe hydrogenation in a single stage, as to an ultraviolet adsorptivity at 260 millimicrons (i.e., 260 UVA) in the range of 3 for a 150 SUS oil, cannot economically be used to reduce the basic nitrogen content below about 10 p.p.m. nor the total nitrogen content below about 20 p.p.m. As can be seen from FIG. 1, both the total and the basic nitrogen contents of such hydrorefined oils typically are greater as the viscosity of the oil increases. This is probably due to less efficient utilization of the hydrogen caused by the hindering effect of the larger oil molecules on hydrogen diffusion.

Also shown, in FIG. 2 is the dramatic degree to which such basic nitrogen can be removed from such a hydrorefined oil by means of an acidic adsorbent, particularly, acid-activated adsorbent clay.

For many uses (as in dark colored rubber vulcanizates or in electrical cables where the oil is not in contact with kraft paper) such severely hydrorefined oils exhibit satisfactory performance even at total nitrogen levels in the range of 30–900 p.p.m. (about 50% of the total nitrogen being "basic" nitrogen). For certain end uses (such as in textile spinning oils, light colored oil-rubber vulcanizate, cables where the oil is in contact with kraft paper, and in refrigerator oils subjected to high operating temperatures) a much more satisfactory performance is obtained with a novel hydrorefined oil which has a viscosity in the range of 100–12,000 SUS at 100° F., contains 5–50% (typically 10–44%) of gel aromatics, and contains less than 10 p.p.m. of basic nitrogen (preferably, less than 5 p.p.m. and more preferred less than 2 p.p.m.).

The phrase "total nitrogen" refers to the nitrogen content of an oil as determined by such methods as that of P. Gouverneur, Anal. Chim. Acta, 26 (1962), 212 or, more preferred, the modified Gouverneur method described by Smith, A. J., et al., Anal. Chim. Acta, 40 (1968), 341–343.

The phase "basic nitrogen" refers to those nitrogen compounds present in crudes, petroleum distillates and residues which have a basic ionization constant, $K_b$, greater than $10^{-12}$. A preferred analytic method for determining the content of such basic nitrogen compounds in hydrorefined oils in the lube oil viscosity range, involves dissolving a sample of the the oil in an appropriate solvent and potentiometrically titrating the solution with perchloric acid in acetic acid. In the case of light-colored oils, the solvent can be glacial acetic acid and para-napthol-benzene can be used as a colormetric indicator as an alternative to the potentiometric procedure. Dark samples and heavier oils are dissolved in chlorobenzene-acetic acid solvent and titrated potentiometrically (utilizing a pH meter or its equivalent and a glass-calomel electrode system).

For the potentiometric titration, the procedure is to place a 20 gram sample of the oil in a 250 ml. tall-form titration beaker and add about 100 milliliters of a mixture of equal quantities of glacial acetic acid and chlorobenzene. The sample is then titrated potentiometrically, at room temperature, while being stirred continually by a magnetic stirrer, with 0.01 N perchloric acid in glacial acetic acid to which has been added about 20 ml. of acetic anhydride for each liter of glacial acetic acid (in order to insure the removal of any water that might be present). The weight percent basic nitrogen is calculated as follows:

$$\text{P.p.m. Basic N} = \frac{(V_1 - V_2)(N)(0.014)_{10}{}^6}{W}$$

Where:

$V_1$ = ml. titrant for sample
$V_2$ = ml. titrant for blank
$N$ = normality of perchloric acid
$W$ = sample weight (grams)

This potentiometric titration can be used to determine the basic nitrogen content of a hydrorefined oil in the range of 1 to at least 2000 p.p.m. and, in the range of 1–10 p.p.m. is at least accurate to within 1 p.p.m. when corrections are made for interferences by hydroxides, some oxides, carbonates, naphthenates, and similar bases (if these are present in the sample).

The phrases "severe hydrorefining" or "hydrogenation" refer to processes conducted in the presence of a hydrogenation catalyst at from about 500–775° F., with hydrogen of 50–100% purity, and from 800–3000 p.s.i. of hydrogen at the reactor inlet (at total pressures from 800–6000 p.s.i.g.) at a fresh feed liquid hourly spaced velocity (LHSV) of from 0.1–8.0 (usually below 2.0), preferably conducted either in vapor phase or trickle phase. Such hydrogenation or severe hydrorefining is to be distinguished from hydrocracking in that the production of "overhead" (i.e., hydrocarbons boiling below 485° F.) is less than 25% by volume per pass through the reactor (and, typically, less than 10%). Product recycle, for example, as in U.S. Pat. No. 2,900,433 can be used to increase severity. Recycle liquid hourly space velocity can vary from 0 to 20; however, we prefer to operate at total liquid throughputs that obtain at greater than 25% of flooding velocity and more preferably at from 40–98% of flooding velocity.

Preferably, the temperature is below that at which substantial cracking occurs, that is, no more than 20 weight percent (preferably less than 10%) of the feed stock is converted to material boiling below 300° F. in a single pass through the reactor. Although the maximum hydrogenation temperature which will not produce substantial cracking is somewhat dependent upon the space velocity, the type of catalyst and the pressure, generally it is below 750° F. but can be as high as 785° F. to allow a margin of safety, we prefer to operate below 700° F. (except when it is desired to obtain a hydrogenated oil containing more gel aromatics than are in the charge). At total pressures below about 2000 p.s.i. we prefer a temperature below about 660° F., since above that temperature the degradtion of oil viscosity can become large.

Typical of such severe hydrorefining methods, when conducted within the aforementioned processing conditions, are those of U.S. Pat. Nos. 2,968,614; 2,993,855; 3,012,963; 3,114,701; 3,144,404; and 3,278,420; and those of the previously referred to copending applications, Ser. Nos. 622,398; 652,026; 636,493; 730,999 and 812,516. The terms "Severely hydrorefined oil" or "hydrogenated oil" include the products, within the lubricating oil boiling range, of such severe hyorefining or hydrogenation. One characteristic of a severely hydrorefined or hydrogenated oil is that the ratio of monocyclic aromatics to polycyclic aromatics is significantly greater than in hydrotreated oils or conventional distillate oils.

Where the desired hydrorefined oil is to be of the naphthenic class, a preferred charge to the hydrogenation reactor can be obtained by vacuum distillation of naphthenic crude oils (as in U.S. Pat. No. 3,184,396) especially those naphthenic crude oils wherein the 1500–3000 SUS (at 100° F.) distillate fractions have viscosity-gravity constants from 0.84 to 0.92. Preferably, such a charge stock should be substantially free of naphthenic acids prior to the hydrorefining. Usually materials boiling below about 600° F. (including residual $H_2S$, $NH_3$, etc.) are removed from the hydrorefined oils, as by atmospheric distillation (and the viscosity can be also be adjusted by choice of distillation end point) prior to clay contacting (if the oils are to be clay finished).

The viscosity of the base oil, or of the final hydrorefined oil, can be adjusted by the addition of other oils of higher or lower viscosity and which are within the lube oil boiling range. For example, a preferred cable oil having a viscosity at 100° F. in the range of 500–2000 SUS can be obtained by blending hydrogenated oil having a viscosity from 300–600 SUS with hydrogenated oil having a viscosity from 1500–3000 SUS and then contacting the resulting blend of hydrogenated oils with sufficient acidic adsorbent or mineral acid to reduce the basic nitrogen content of the oil to below 10 p.p.m.

FURTHER DESCRIPTION OF THE DRAWINGS

FIG. 1 herein illustrates the typical contents of total nitrogen and basic nitrogen for severely hydrorefined naphthenic oils in the viscosity range from 50 to over 6000 SUS. The curves can be extended (either by mathematical means or by use of a French curve), to obtain typical nitrogen contents of oils as high as 12,000 SUS at 100° F.

In FIG. 1, two curves have been drawn to illustrate the relationship between the total basic nitrogen content of severely hydrorefined oils of a number of viscosity ranges. The nitrogen content has been plotted against the 260 UVA, since the 260 UVA indicates the degree to which the oils have been hydrogenated. Also illustrated in a third curve is the basic nitrogen content of the charge oils before hydrorefining.

For example, in FIG. 2, a 2500 SUS naphthenic distillate (which was substantially free from naphthenic acid) was hydrorefined at 650° F., 0.5 LHSV at 1200 p.s.i.g. of 80% hydrogen (at the reactor inlet. The 2500 SUS oil contained about 270 p.p.m. of basic nitrogen before the hydrorefining. The hydrorefined oil contained about 180 p.p.m. of basic nitrogen (and about 350 p.p.m. total nitrogen). The UVA of the 2500 SUS distillate before hydrorefining was about 10.8 and, the hydrorefined oil had a 260 UVA of about 5.6, indicating a severe hydrogenation for such a relatively highly viscous distillate.

FIG. 2 of the drawings illustrates the degree to which the basic nitrogen in a hydrorefined oil can be reduced by contacting the oil with an acid clay. In the figure, the acid clay used had an acidity equivalent to 10.2 mg. KOH per gram. In FIG. 2, the basic nitrogen is plotted on a logarithmic scale, indicating that as the lower levels of nitrogen content are approached, it becomes progressively more difficult to remove basic nitrogen with the acid clay adsorbent. The two curves in FIG. 2 illustrate that as the viscosity of the hydrorefined oil increases, greater amounts of acid clay are necessary to reduce the basic nitrogen content to less than 10 p.p.m. (and or more preferably to less than 5 p.p.m.). With the more highly viscous, hydrorefined oils, it becomes more economical to utilize a mineral acid, and to dilute the oil with a non-reactive, less viscous, lower boiling solvent (such as iso-octane or gas oil). Such contacting with a mineral acid can be by the processes shown in the previously referred to copending applications, Ser. No. 622,398 and Ser. No. 652,026. Other preferred processes for removing basic nitrogen from such oils can be found in the copending application of Schneider and Stuart, Ser. No. 657,438.

ILLUSTRATIVE EXAMPLES

Example I

A 2500 SUS naphthenic distillate (which was substantially free from naphthenic acid) was hydrorefined at 650° F., 0.5 LHSV at 1200 p.s.i.g. of 80% hydrogen (at the reactor inlet). The 2500 SUS oil contained about 270 p.p.m. of basic nitrogen before the hydrorefining. The hydrorefined oil contained about 180 p.p.m. of nitrogen (and about 350 p.p.m. total nitrogen). The UVA of the 2500 SUS distillate before hydrorefining was about 10.8 and, the hydrorefined oil had a 260 UVA of about 5.6, indicating a severe hydrogenation for such a relatively highly viscous distillate. The appropriate values for the charge and hydrogenated oil produced from this charge are plotted n FIG. 1.

Example II

FIG. 2 of the drawings illustrates the degree to which the basic nitrogen in a hydrorefined oil can be reduced by contacting the oil with various amounts of an acid-activated clay. The upper curve in FIG. 2 shows the nitrogen levels which were obtained by such contact of the 2500 SUS hydrorefined oil of Example 1. In the figure, the acid clay used had an acidity equivalent to 10.2 mg. KOH per gram. In FIG. 2, the basic nitrogen is plotted on a logarithmic scale, indicating that as the lower levels of nitrogen content are approached, it becomes progressively more difficult to remove basic nitrogen with the acid clay adsorbent. The two curves in FIG. 2 illustrate that as the viscosity of the hydrorefined oil increases, greater amounts of acid clay are necessary to reduce the basic nitrogen content to less than 10 p.p.m. (and or more preferably to less than 5 p.p.m.). With the more highly viscous, hydrorefined oils it becomes more economical to utilize a mineral acid, and to dilute the oil with a non-reactive, less, viscous, lower boiling solvent (such as iso-octane or gas oil). Such contacting with a mineral acid can be by the processes shown in the previously referred to copending applications, Ser. No. 622,398 or Ser. No. 652,026. Other preferred processes for removing basic nitrogen from such oils are those shown in the copending application of Schneider and Stuart, Ser. No. 657,438. Cables containing kraft paper and the oils containing less than 5 p.p.m. of basic nitrogen show good performance under service conditions.

Example III

A residuum was obtained from the distillation of naphthenic crude (VGC of 0.89) by the caustic distillation process described in U.S. 3,184,396. This residuum was distilled under a lower pressure than that used in the first distillation and a 35 volume percent overhead fraction (viscosity 13,000 SUS at 100° F. and 200 SUS at 210° F.) was recovered. This overhead will be referred to hereinafter as "heavy distillate from heavy residuum" or by the abbreviation "HDFHR." The HDFHR was hydrorefined, in the presence of a sulfided Ni-Mo oxide catalyst, at a temperature of about 605° F., 1140 p.s.i.g. total pressure (about 75% $H_2$ at reactor inlet), at a 7 to 1 volume ratio of recycle to charge and with a reactor gas bleed of 18,000 s.c.f.h. The hydrogenated product (95 volume percent yield) had a viscosity at 100° F. of 8850 SUS and 170 at 210° F. This hydrogenated oil had an initial ASTM color of 2.0 and remained stable in color if stored at temperatures below 130° F. When contacted with 10 lb./bb. of $H_2SO_4$, washed and neutralized and finished with 10 lb./bbl. of attapulgite, the final oil had an initial power factor (100° C.) of 0.0006 and an aged (with Cu) 100° C. power factor of 0.012.

Table I herein reports the additional improvement in electrical properties which can be obtained when the "HDFHR" is rteated with an acid such as $H_2SO_4$, washed and neutralized prior to the hydrogenation step. Also shown is the additional improvement that can be obtained by a final contacting with acid-activating clay.

TABLE I.—8,800 SUS (at 100° F.) CABLE OILS MADE FROM HEAVY DISTILLATE FROM HEAVY RESIDUUM (HD-FHR)

| Step further treatment of "HDFHR" | Basic nitrogen, p.p.m. | ASTM dissipation factor | |
|---|---|---|---|
| | | Initial at 100° C. | Aged 4 days, Cu. 115° C. |
| 1st 10 lb./bbl. $H_2SO_4$<br>2d Hydrogenation<br>3d 10 lb./bbl. acid-activated clay | <1 | | 0.0361 |
| 1st 25 lb./bbl. $H_2SO_4$<br>2d Hydrogenation | 23 | | |
| 1st 25 lb./bbl. $H_2SO_4$<br>2d Hydrogenation<br>3d 10 lb./bbl. acid-activated clay | <1 | 0.0002 | 0.0160 |
| 1st 40 lb./bbl. $H_2SO_4$<br>2d Hydrogenation | 8 | | |
| 1st 40 lb./bbl. $H_2SO_4$<br>2d Hydorgenation<br>3d 10 lb./bbl. acid-activated clay | <1 | 0.0001 | 0.0092 |
| Commercial polybutene (2,500 SUS at 100° F.) | <1 | 0.0002 max. | 0.0021 |

The invention claimed is:

1. In a proces wherein a topped naphthenic crude is heated and distilled under vacuum in a first distillation step to remove gas oil and lubricating oil fractions and a heavy residuum containing asphaltic and high molecular weight naphthenic acid components is obtained, the improvement which comprises (a) subjecting a charge comprising said heavy residuum to vacuum distillation in a second distillation step at a pressure lower than that to which the residuum was subjected in said first distillation step;

(b) separating from the second distillation step a heavy distillate having an initial ASTM D–1500 color greater than 7.5, SUS viscosity at 100° F. in the range of 8100–14,000 SUS, a 260 UVA greater than 12.0 and containing high molecular weight naphthenic acids;

(c) catalytically hydrogenating said heavy distillate at a temperature in the range of 500–775° F., with hydrogen of 50–100% purity, and from 800–3000 p.s.i. of hydrogen at the reactor inlet, at total pressures from 800–6000 p.s.i.g., at a fresh feed liquid hourly space velocity of from 0.1–8.0; and (d) recovering hydrogenated oil having an initial ASTM D–1500 color less than 2.5, a viscosity in the range of 5000–12,000 SUS at 100° F., an API gravity at 60° F. in the range of 15.5–18.5, a refractive index in the range of 1.51–1.53, a 260 UVA less than 10.0, a flash point above 425° F., a pour point greater than 10° F. and containing at least 40 weight percent gel aromatics.

2. Process according to claim 1 wherein the hydrogenating of step (c) is at a temperature below 660° F.

3. Process according to claim 1 wherein said hydrogenated oil recovered in step (d) is further refined by contacting with a mineral acid.

4. Process according to claim 3 wherein said mineral acid is $H_2SO_4$ or HF.

5. Process according to claim 1 wherein said hydrogenated oil recovered in step (d) is further refined by contacting with a solid adsorbent.

6. Process according to claim 5 wherein said solid adsorbent is selected from the group consisting of naturally occurring fuller's earth bleaching clay, activated carbon, alumina, acid-activated clay and mixtures of two or more of such adsorbents.

7. Process according to claim 6 wherein said solid adsorbent comprises attapulgite.

8. Process according to claim 6 wherein said solid adsorbent comprises an acid-activated clay.

9. Process according to claim 3 wherein an oil is recovered which contains from 30–65 weight percent of gel aromatics, having a viscosity in the range of 8100–12,000 SUS at 100° F. and which by Engler distillation has a 5% point of at least 825° F., a 50% point of at least 925° F. and a 90% point of at least 975° F., said oil having an ASTM D–1500 initial color no greater than 2.5, an initial ASTM D–924 power factor at 100° C. of no more than 0.01, an aged (with copper) ASTM D–1934 power factor at 100° C. no greater than 0.030 and an ASTM D–92 flash point of at least 500° F.

10. Process according to claim 6 wherein an oil is recovered which contains from 30–65 weight percent of gel aromatics, having a viscosity in the range of 8100–12,000 SUS at 100° F. and which by Engler distillation has a 5% point of at least 825° F., a 50% point of at least 925° F. and a 90% point of at least 975° F., said oil having an ASTM D–1500 initial color no greater than 2.5, an initial ASTM D–924 power factor at 100° C. of no more than 0.01, an aged (with copper) ASTM D–1934 power factor at 100° C. no greater than 0.030 and an ASTM D–92 flash point of at least 500° F.

11. A naphthenic petroleum oil which contains from 30–65 weight percent of gel aromatics, having a viscosity in the range of 8100–12,000 SUS at 100° F. and which by Engler distillation has a 5% point of at least 825° F., a 50% point of at least 925° F. and a 90% point of at least 975° F., said oil having an ASTM D–1500 initial color no greater than 2.5, an initial ASTM D–924 power factor at 100° C. of no more than 0.01, an aged (with copper) ASTM D–1934 power factor at 100° C. no greater than 0.030 and an ASTM D–92 flash point of at least 500° F.

12. A naphthenic petroleum oil according to claim 11 and having an API gravity at 60° F. in the range of 15.5–18.5.

13. A naphthenic petroleum oil according to claim 12 and having a refractive index in the range of 1.51–1.53, a 260 UVA less than 10.0, a pour point greater than 10° F. and containing at least 40 weight percent gel aromatics.

14. Process according to claim 1 wherein said crude has 1500–3000 SUS (at 100° F.) distillate fractions having viscosity-gravity constants from 0.84–0.92.

References Cited

UNITED STATES PATENTS

| | | | |
|---|---|---|---|
| 3,184,396 | 5/1965 | Armstrong | 196—132 |
| 2,288,373 | 6/1942 | Smith et al. | 208—14 |
| 3,242,068 | 3/1966 | Paterson | 208—18 |
| 3,414,506 | 12/1968 | Campagne | 208—18 |
| 3,462,358 | 8/1969 | Mills et al. | 208—14 |
| 3,502,567 | 3/1970 | Mills et al. | 208—264 |

FOREIGN PATENTS

| | | | |
|---|---|---|---|
| 743,525 | 9/1966 | Canada | 208—14 |

HERBERT LEVINE, Primary Examiner

U.S. Cl. X.R.

208—92, 94, 264, 88